United States Patent
Okazaki et al.

(10) Patent No.: US 7,577,425 B2
(45) Date of Patent: **\*Aug. 18, 2009**

(54) METHOD FOR SECURING ACCESS TO MOBILE IP NETWORK

(75) Inventors: Satomi Okazaki, Palo Alto, CA (US); Atsushi Takeshita, Sunnyvale, CA (US); Yiqun Yin, San Mateo, CA (US); Aki Yokote, San Francisco, CA (US)

(73) Assignee: NTT DOCOMO Inc., Tokyo (JP)

( * ) Notice: Subject to any disclaimer, the term of this patent is extended or adjusted under 35 U.S.C. 154(b) by 1299 days.

This patent is subject to a terminal disclaimer.

(21) Appl. No.: 10/146,548

(22) Filed: May 15, 2002

(65) Prior Publication Data
US 2003/0092425 A1 May 15, 2003

Related U.S. Application Data

(60) Provisional application No. 60/332,396, filed on Nov. 9, 2001, provisional application No. 60/345,967, filed on Nov. 9, 2001.

(51) Int. Cl.
*H04M 1/66* (2006.01)
(52) U.S. Cl. .................. 455/411; 455/436; 455/432.1; 380/281; 380/282; 380/45
(58) Field of Classification Search ............... 455/410, 455/411, 436, 437, 438, 432.1, 435.1; 370/331; 380/281, 282, 45
See application file for complete search history.

(56) References Cited

U.S. PATENT DOCUMENTS
5,091,942 A    2/1992    Dent
(Continued)

FOREIGN PATENT DOCUMENTS
JP    6-500900    1/1994
(Continued)

OTHER PUBLICATIONS
S. Glass, T. Hiller, S. Jacobs, and C. Perkins, "Mobile IP Authentication, Authorization, and Accounting Requirements," IETF Network Working Group, Request for Comments: 2977. Oct. 2000.
(Continued)

*Primary Examiner*—Temica M Beamer
(74) *Attorney, Agent, or Firm*—Haynes and Boone, LLP

(57) ABSTRACT

Networks consist of administrative domains each including an administrative server and at least one mobility agent deployed therein. The mobility agents offer connectivity to a mobile node via Advertisement messages in a form verifiable by the mobile node. Each Advertisement message is signed by a private key of the advertising mobility agent and accompanied by a certificate that contains a public key of the advertising mobility agent and is signed by a private key of the administrative server of the advertising mobility agent. Thus, if the mobile node has the public key of the administrative server, it can authenticate the Advertisement message. If the mobile node does not have the public key, it requests the public key when it registers with the mobility agent. The public key of the administrative server is sent in a certificate signed by the private key of the administrative server ultimately responsible for authentication of the mobile node.

37 Claims, 7 Drawing Sheets

U.S. PATENT DOCUMENTS

| | | | |
|---|---|---|---|
| 6,587,680 B1 * | 7/2003 | Ala-Laurila et al. | 455/411 |
| 6,813,501 B2 * | 11/2004 | Kinnunen et al. | 455/456.2 |
| 6,934,533 B2 * | 8/2005 | Joyce et al. | 455/414.1 |
| 6,988,146 B1 * | 1/2006 | Magret et al. | 709/238 |
| 7,286,671 B2 * | 10/2007 | Yegin et al. | 380/270 |
| 2001/0050907 A1 * | 12/2001 | Madour et al. | 370/329 |
| 2002/0024943 A1 * | 2/2002 | Karaul et al. | 370/338 |
| 2002/0145993 A1 * | 10/2002 | Chowdhury et al. | 370/338 |
| 2002/0174335 A1 * | 11/2002 | Zhang et al. | 713/168 |
| 2003/0026220 A1 * | 2/2003 | Uhlik et al. | 370/328 |

FOREIGN PATENT DOCUMENTS

| | | |
|---|---|---|
| JP | 9-289675 | 4/1997 |
| JP | 2948814 | 2/1999 |
| JP | 2002-541685 | 3/2002 |
| WO | WO 92/02087 | 2/1992 |
| WO | WO 00/48358 | 8/2000 |

OTHER PUBLICATIONS

C. Perkins, "IP Mobility Support." IETF Network Working group, Request for Comments: 2002, Oct. 1996.

P. Calhoun and C. Perkins, "Diameter Mobile IP Extensions." IETF AAA Working Group, Internet-Draft, Feb. 2001.

P. Calhoun, H. Akhtar, J. Arkko, E. Guttman, A. Rubens, and G. Zorn, "Diameter Base Protocol." IETF AAA Working Group, Internet-Draft, May 2001.

* cited by examiner

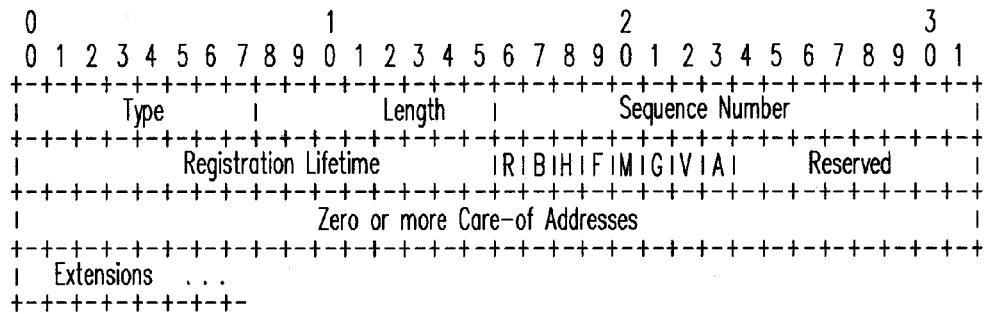
FIG. 5
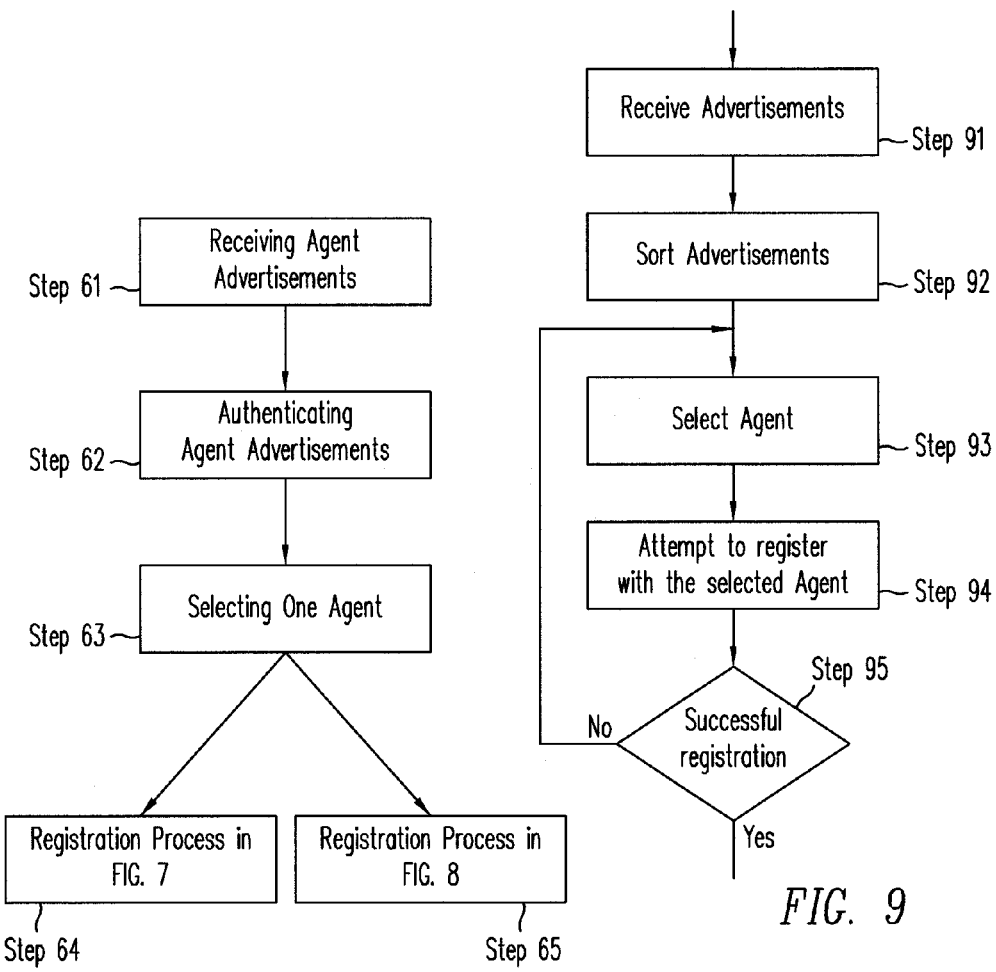
FIG. 6
FIG. 9

METHOD FOR SECURING ACCESS TO MOBILE IP NETWORK

This application claims the benefit of U.S. Provisional Application No. 60/332,396, filed Nov. 9, 2001, titled "MOBILE IP REGISTRATION," which is hereby incorporated by reference. This application is also cross referenced to U.S. Provisional Application No. 60/345,967, filed Nov. 9, 2001, entitled "Secure Network Access Using Router Discovery and AAA," which is hereby incorporated by reference.

BACKGROUND OF THE INVENTION

This invention relates in general to security protocols for authenticating networks offering connectivity to mobile nodes. The security protocols according to the present invention builds upon the AAA framework and uses the public key encryption as an authentication mechanism.

The growing dependence on instantaneous personal communication devices is creating huge demand for global wireless communication capabilities. The role of wireless has gone well beyond the traditional voice and paging mobile radio services of a few short years ago. The International Telecommunication Union (ITU) of the Internet Society, the recognized authority for worldwide data network standards, has recently published its International Mobile Telecommunications-2000 (IMT-2000) standard. The standard proposes so-called third generation (3G) and beyond (i.e., 3.5G, 4G etc.) data networks that include extensive mobile access by wireless, mobile nodes including cellular phones, personal digital assistants (PDAs), handheld computers, and the like. In the proposed third generation and beyond networks, mobile nodes are free to move and allowed to change their points of attachment from one network to another while maintaining access to network resources. For that purpose, such data networks must be designed to provide mobility support for facilitating addressing of roaming mobile nodes, dynamic rerouting of data packets to such roaming mobile nodes over the networks, and most importantly authentication between such roaming mobile nodes and their visited networks.

The Internet Engineering Task Force (IETF), an international community of network designers, operators, vendors, and researchers concerned with the evolution of the Internet architecture and the smooth operation of the Internet, have proposed several standards for mobility support. These include proposed standards for IP Mobility Support such as IETF RFC 2002, also referred to as Mobile IP Version 4 (IPv4), and draft working document <draft-ietf-mobileip-ipv6-13> entitled "Mobility Support in IPv6," also referred to as Mobile IP Version 6, both of which are incorporated herein by reference.

According to the protocol operations defined in Mobile IPv4 and IPv6, while maintaining access to network resources, a mobile node is allowed to move over networks and change its point of attachment from one network to another. This operation is referred to as "Layer 3 (L3) handoff" and should be distinguished from Layer 2 (L2) handoff in which a mobile node changes its link layer connection from one access point to another within the same network. An L3 handoff is necessarily accompanied by an L2 handoff but not vice versa. Mobile IPv4 and IPv6 provide mechanisms to be used for the L3 handoff operation. In both Mobile IPv4 and IPv6, the handoff operation begins with the process of locating a next agent or router for a mobile node to handoff to. In Mobile IPv4, this process is called "Agent Discovery," in which a mobile node searches for mobility agents offering connectivity. Mobility agents advertise their presence periodically. By listening to the Agent Advertisement messages from nearby mobility agents, the mobile node can detect the agent to which it is currently connected or candidate agents to which it may be able to handoff. A mobile node may solicit Agent Advertisements from nearby mobility agents by broadcasting an Agent Solicitation. In Mobile IPv6, the same process is called "Neighbor Discovery" in which Routers offer connectivity through Router Advertisements. A mobile node may solicit Router Advertisements from nearby routers by broadcasting a Router Solicitation.

Of central importance in the L3 handoff operation is registration. A mobile node is always addressable by its "home address," an IP address assigned to the mobile node by its home agent on the home link or chosen by the mobile node itself. While situated away from its home on a foreign link, however, a mobile node is configured with a care-of address which indicates the mobile node's current point of attachment to the Internet. In Mobile IPv4, the care-of address is the address of the foreign agent, and the mobile node operating away from home registers its care-of address with its home agent. The home agent that has received a registration request then intercepts packets destined for the mobile node and routes the packets to the mobile node's care-of address. In Mobile IPv6, a mobile node away from home sends a binding update request to its home router and a corresponding node in communication. The corresponding node that has received the binding update request then sends packets directly to the mobile node without routing them through the home router.

A crucial security issue arises when a mobile node is going to handoff from a first network to a second network. The second network has to be authenticated to the mobile node so that it does not get tricked into operating a malicious environment. For instance, fast handoffs, as a mobile node moves from one network to another, are crucial in providing good, continuous service to users. However, it has been pointed out that there may be rogue foreign agents or routers which try to deter a mobile node from achieving a fast handoff by sending bad Advertisement messages. An example of such a bad Advertisement message is one that contains false information that tricks the mobile node into believing that it is preferable to connect to the advertising foreign agent or router over others, yet it is not in reality. A mobile node lured to attempt to register with such a malicious agent or router would probably result in failing to register after a number of registration attempts. Even if a mobile node is successful registering with such a foreign agent or router, the mobile node may suffer poor connectivity or poor service.

Currently, there are numerous authentication mechanisms implemented and deployed for various access technologies. Examples include authentication of PPP and 802.11 networks. However, these approaches do not provide a universal solution because these are link-layer solutions and applicable only to specific access technologies. In this regard, a network-layer level solution is clearly preferable. A network-layer level solution should stand valid no matter what access technology is used in the link layer operating beneath it. Although being an L3 approach, IPSec authentication service cannot be a viable solution for authenticating a network and a mobile node to each other in the L3 handoff situation. IPSec authentication is predicated on a pre-existing security association between two entities. It cannot be assumed that a given foreign agent or router will have a security association with every mobile node that receives its Advertisements, or alternatively, a given mobile node will have a security association with every nearby foreign agent or router sending Advertisements.

BRIEF SUMMARY OF THE INVENTION

In the present invention, mobility agents offering connectivity send out Advertisement messages in a form verifiable by mobile nodes. According to the present invention, networks consist of administrative domains each has an administrative server and at least one mobility agent deployed therein. The mobility agents offer connectivity via Advertisement messages each certified by a trusted entity so that the mobile nodes can verify the authenticity of the messages.

The trusted entity may be an administrative server serving the domain to which advertising mobility agents belong. The Advertisement message may be signed by a private key of the advertising mobility agent and accompanied by a certificate that contains a public key of the advertising mobility agent and is signed by a private key of the trusted administrative server. Thus, if the mobile node has the public key of the trusted administrative server, it can verify the authenticity of the message.

If a mobile node hears Advertisement messages and is successful verifying some of the Advertisements, the mobile node selects one of the verified Advertisements and registers with the mobility agent that has sent the selected Advertisement. The selection of mobility agent is made based on connectivity to the advertising mobility agents.

Even when the mobile node cannot verify any of the advertising mobility agents, the mobile node nonetheless select one of the advertising mobility agents and proceeds to register with the selected mobility agent. Through this registration process, the mobile node obtains the public key of the trusted administrative server. The public key of the trusted administrative server is certified by the home administrative server ultimately responsible for authentication of the mobile node. Since certified by the home administrative server, which the mobile node trusts, the mobile node can also trust the authenticity of the public key of the trusted administrative server.

The present invention provides a unique method for selecting one mobility agent when the mobile node cannot authenticate any of the Advertisements messages it received. The mobile node first sorts in groups the Advertisement messages received over a certain period of time. This sorting may be made in the order of consistency of parameters contained in the messages. The mobile node then selects one group of Advertisement messages and selects one Advertisement message in the selected group. During this process, the selection of group may be made in the order of higher consistency of parameters, and the selection of Advertisement message is made based on connectivity to the mobility agents sending the messages. The mobile node then proceeds to register with the mobility agent that has advertised the selected message. If registration is failed with the selected advertising mobility agent, the mobile node discards all of the Advertisements in the selected group and selects another group that has next higher consistency. The mobile node repeats this process until it successfully registers with a mobility agent.

BRIEF DESCRIPTION OF SEVERAL VIEWS OF THE DRAWINGS

FIG. 5 is a graphical illustration of Mobile IP Advertisement used in the present invention;

FIG. 6 is a flow chart illustrating the agent verification process according to an embodiment of the present invention;

FIG. 9 is a flow chart illustrating the process of selecting an agent according to the present invention where a mobile node cannot verify any of the nearby agents.

DETAILED DESCRIPTION OF THE INVENTION

The presently preferred embodiments of the invention are described herein with reference to the drawings, wherein like components are identified with the same references. The descriptions of the preferred embodiments contained herein are intended to be exemplary in nature and are not intended to limit the scope of the invention.

Figure 1:
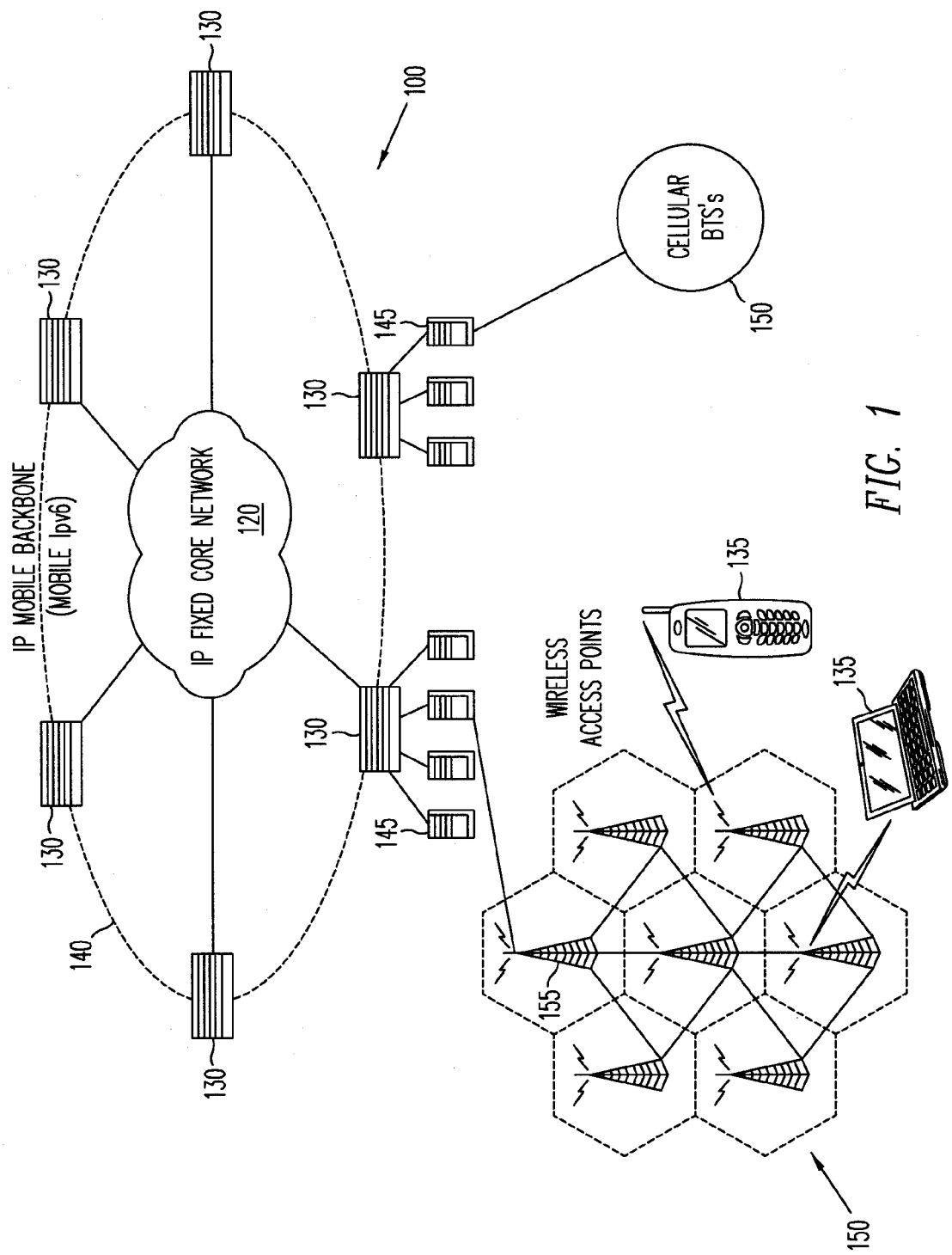
FIG. 1 illustrates an exemplary third generation, wireless, mobile access, IP network in which the invention is intended to find application.

FIG. 1 illustrates an exemplary third generation, wireless, mobile access, IP network 100 in which the invention is intended to find application. For purposes of the present description, it is assumed the data network 100 adheres to the IMT-2000 standards and specifications of the ITU for wireless, mobile access networks. Additionally, it is assumed the data network 100 implements Mobile IP support according to the proposed Mobile IPv4 and IPv6 standards of the IETF. The wireless, mobile access, IP network 100 has as its core an IP data network 120 comprising numerous fixed nodes (not shown), i.e., fixed points of connection or links. Digital data is communicated within and over the network in accordance with Internet protocols. Built on the core network 120 is a collection of gate routers 130 which collectively form an IP mobile backbone 140 and function, in accordance with the conventional Internet addressing and routing protocols, to route packets of data between source and destination nodes connected to the network. The gate routers 130 forming the IP mobile backbone 140 are themselves nodes of the core network 120 and have unique IP addresses for communication over the core network 120. Connected to each of the gate routers 130 is servers 145, which also have unique IP addresses and function as home agents (HA) and foreign agents (FA) to interface mobile nodes 135 to the core network 120, as specified in Mobile IPv4. In Mobile IPv6, these servers 145 function as home routers and foreign routers for providing IP connectivity to mobile nodes 135. The network 120 may contain networks that each implement either Mobile IPv4 or Mobile IPv6. Therefore, throughout the present application, the term "agent" may be used interchangeably with the term "access router" or "router." So may "Agent Discovery" with "Neighbor Discovery," "Agent Solicitation" with "Router Solicitation" and "registration request" with "binding update request."

The mobile nodes are mobile, wireless communication devices including cellular handsets, cellular telephones, hand-held computers, personal information managers, wireless data terminals, and the like. Each of the mobile nodes 135 is assigned a home subnetwork. Each mobile node has a home agent or router which is in fact a central server on its home subnetwork. For each of the mobile nodes 135, the home agent is the original point of attachment to the network 120, and each mobile node is addressable by its home address assigned by its home agent or chosen by the mobile node itself at its home subnetwork. Other agents 145 function as foreign agents or routers. Foreign agents 145 may provide network access points for a mobile node 135 when it migrates to their subnetworks. While situated away from its home on a foreign subnetwork, a mobile node is configured with a care-of address which is the address of the foreign subnetwork in which it is operating and indicates the mobile node's current point of attachment to the Internet. Through the registration process, the mobile node's home agent 145 maintains current location information for the mobile node 135 when the mobile node is operating away from its home subnetwork.

The agents 145 each have a base transceiver station network 150 by way of which the mobile nodes 135 communicate with their agents or routers 145. Each of the base transceiver station networks 150 comprises a multiple base transceiver stations or access points (AP) 155. The mobile nodes 135 and the APs employ known CDMA, W-CDMA or other known digital data communication technology to communicate with each other. The construction, arrangement, and functionality of the AP networks 150 or APs 155 are conventional and standard. Similarly, the implementation of CDMA, W-CDMA or other digital data communication technologies in wireless, mobile node devices 135 and APs 155 is standard. Detailed description thereof is not necessary to a complete understanding and appreciation of the present invention and is therefore omitted.

Within the overall data network 100, two levels of mobility handoff are contemplated. In Layer 2 (L2) handoff refers to a change in location of a mobile node within an AP network 150, in which case the mobile node's network link does not change but a mobile node changes its connection from one AP 155 to another. The handling of L2 handoff is well known in wireless, cellular communication networks. For example, it is well known to monitor an Layer 2 signal or a beacon signal for detecting and handling communication handoffs between APs while a mobile node 135 moves within an AP network 150. In Layer 3 (L3) handoff refers to a change in point of attachment from one subnetwork to another. In other words, the mobile node leaves one subnetwork and enters another subnetwork served by another agent 145. In L3 handoffs, a mobile node monitors Layer 3 signals from nearby agents to detect when to change its point of attachment to the network between subnet servers.

Figure 2:
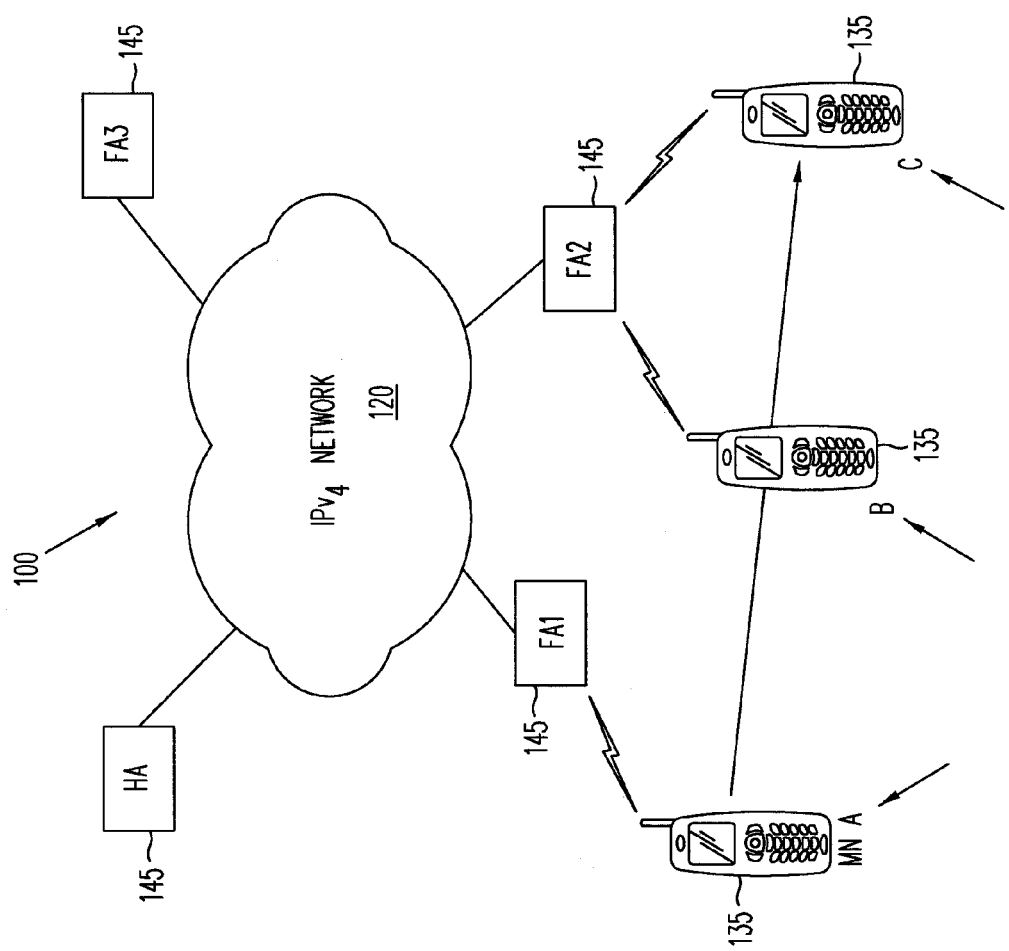
FIG. 2 is a simplified graphical illustration of mobile node handoff process in a third generation, wireless, mobile access data network.

FIG. 2 provides a simplified graphical illustration of mobile node L3 handoff process in a third generation, wireless, mobile access data network. In FIG. 2, the network 100 includes the core network 120 and agents 145 connected to the network 120. These agents 145 include a home agent HA and foreign agents FA1, FA2 and FA3. For a mobile node (MN) 135, the home agent HA is the original point of attachment to the network 120. The foreign agents FA1, FA2 and FA3 may provide network access points for the mobile node MN when it migrates to their subnetworks. In the example illustrated in FIG. 2, MN is originally located at a starting location A and moving toward a location C through an intermediate location B. At the starting location A, MN is operating within the foreign subnetwork served by FA1 and connected to the network 120 via FA1. On the other hand, the location C is located within the foreign subnetwork operated by FA2. Thus, as MN is traveling across the subnetwork operated by FA1 and entering the subnetwork operated by FA2, an L3 handoff takes place on MN in which MN switches its network connection from FA1 to FA2.

Mobility of MN is detected via a discovery mechanism. This mechanism may be Agent Discovery in Mobile IPv4 or Neighbor Discovery in Mobile IPv6. Pursuant to the discovery mechanism, FA1, FA2 and FA3 advertise their presence periodically via Agent Advertisements in Mobile IPv4 or Router Advertisements in Mobile IPv6. MN may solicit these Advertisement messages from the foreign agents 145 through an Agent Solicitation in Mobile IPv4 or a Router Solicitation in Mobile IPv6. Receiving these Advertisements, MN can determine the subnetwork in which it is operating. At the starting location A, MN receives Agent Advertisements only from FA1, which tells MN that it is on the foreign subnetwork operated by FA1. As MN reaches the intermediary location B and continues toward the location C, the Advertisements from FA2 begin to reach MN. Thus, MN realizes that it is leaving FA1's subnetwork and entering the subnetwork operated by FA2. There comes a point, after MN passes the intermediary location B, at which an L2 handoff takes place through which MN switches its L2 connection from one of the APs 155 in the subnetwork operated by FA1 to an AP 155 in the subnetwork operated by FA2. After the L2 handoff, only Advertisement messages from FA2 reach MN. MN thus determines, based the Advertisement messages reaching it, that it is now operating in the subnetwork served by FA2. MN then begins a registration process by sending a registration request or binding update to HA through FA2. The registration request or binding update contains a care-of address, i.e., the address of FA2's subnetwork, which it has obtained from the Advertisement messages from FA2. If the identity of MN is successfully verified at HA, HA stores the care-of address of MN and returns a reply to FA2, which processes the reply and passes it on to MN. The reply authenticates MN to FA2 and authorizes establishment of connection between MN and FA2. After this registration process, MN completes the L3 handoff from FA1 to FA2.

As the popularity of mobile data communication increases, so do unwanted mobility agents that lure mobile nodes to register with them, yet these agents in reality only offer poor connectivity or services and prevent mobile nodes from achieving fast handoffs. With the increase of these unwanted mobility agents, the need has been generated to identify such malicious agents before mobile nodes begin the Mobile IP registration process with those unwanted agents. The present invention provides security protocols for authenticating mobility agents offering connectivity so that mobile nodes can identify such malicious agents and avoid being lured to handoff to them.

The security mechanism according to the present invention builds upon AAA protocols. AAA protocols, such as RADIUS and DIAMETER, are in use within the Internet today to provide authentication, authorization and accounting services for dial-up computers. Such AAA administrative services, particularly the authentication service provided by the AAA servers, are equally valuable for mobile nodes using Mobile IP. Mobile IP is a technology that allows a mobile node to migrate from one network to other networks. AAA protocols define administrative domains each of which consists of a network or a collection of networks operating under a common administration. Thus, depending on how AAA administrative domains are defined, movements of a mobile node from one network to other networks may be either within the same administrative domain or to other administrative domains. But by mapping Mobile IP movements of a mobile node onto AAA administrative domains, the AAA administrative services are available for the mobile node implementing Mobile IP. In fact, Mobile IP can be implemented on the AAA infrastructure with very little changes to their basic frameworks. For instance, clients in AAA protocols are considered mobile nodes in Mobile IP. Mobility agents in Mobile IP perfectly fit in the position of attendants in AAA protocols. By augmenting the functionality of mobility entities, such mobile nodes and mobility agents or routers, so that they can understand the AAA messages, it is then possible to implement Mobile IP on the AAA infrastructure.

Generally, the AAA authentication mechanism works in such a way that a first AAA entity wishing to communicate with a second entity presents a credential to the second entity, and communication is allowed between the two entities only when the second entity can successfully validate the credential of the first entity. The AAA servers function as key distribution centers, and at the request of AAA entities, create and distribute keys for use in validating credentials presented between two AAA entities. AAA protocols are designed to work with different key algorithms. Some algorithms rely on the existence of a public key infrastructure while others rely on distribution of symmetric keys. The present invention will be explained with networks that adopt the public key infrastructure. However, those skilled in the art will appreciate that other key algorithms may also be adopted in implementation of the present invention.

Figure 3:
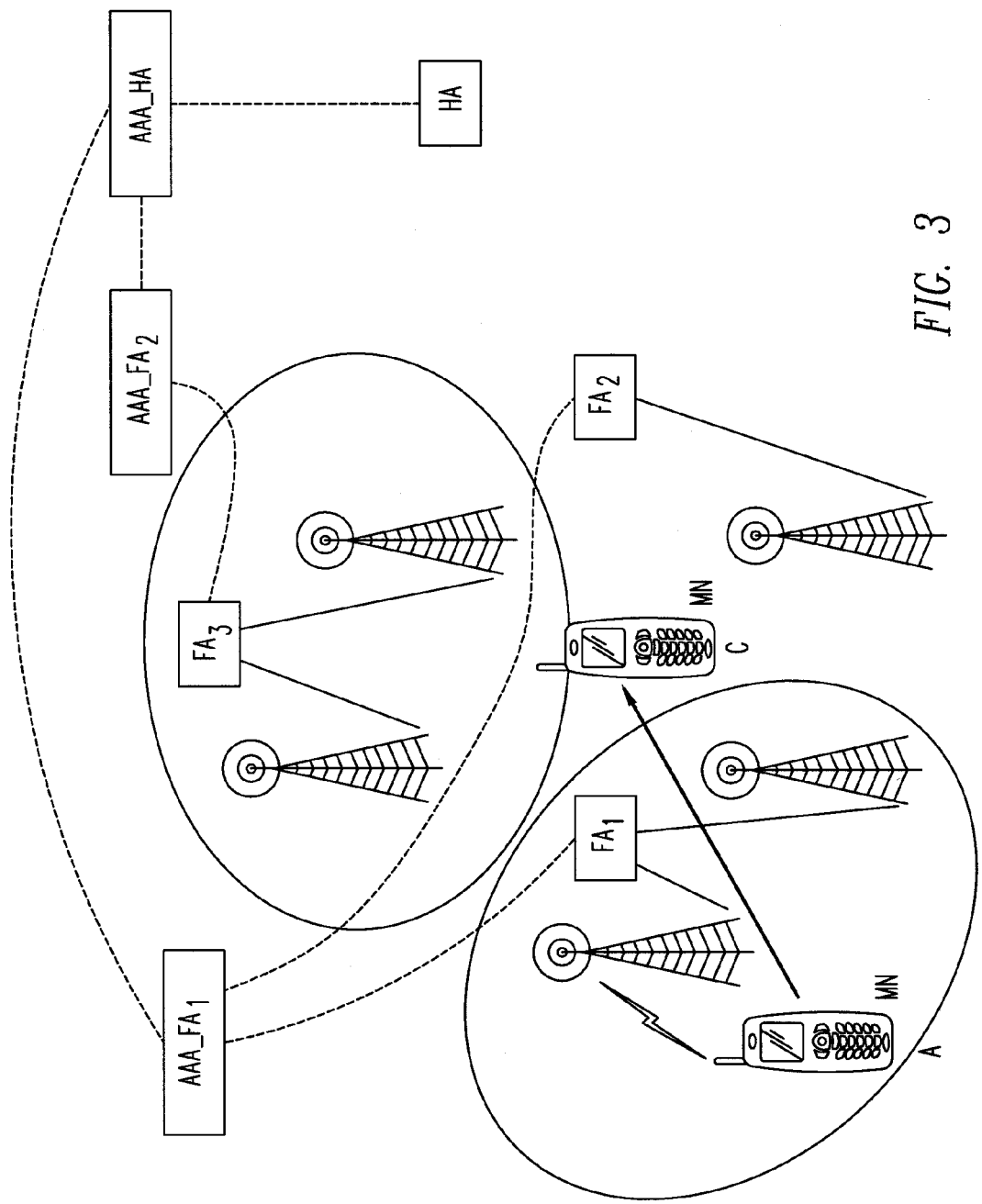
FIG. 3 is a simplified graphical illustration of a third generation, wireless, mobile access data network according to the present invention that builds on AAA protocols.

The registration process according to the present invention will be further discussed with reference to FIG. 3. FIG. 3 is a simplified graphical illustration of a third generation and beyond wireless, mobile access data network in which the registration process according to the present invention takes place. Like the network illustrated in FIG. 2, the network illustrated in FIG. 3 implements either Mobile IPv4 or IPv6. The network in this embodiment builds upon AAA protocols and thus has a plurality of administrative servers deployed therein each of which forms its own administrative domain. Pursuant to AAA protocols, each administrative server functions to authenticate, authorize and collect accounting information for services rendered to mobile nodes.

For simplicity, FIG. 3 shows only three such servers AAA_HA, AAA_FA1 and AAA_FA2. The server AAA_HA is a home administrative server responsible for authentication of a mobile node MN. In most cases, the mobile node originates from the administrative domain formed by the server AAA_HA, and the home administrative domain encompasses a home agent HA and the subnetwork operated by HA. In other words, in most cases, the authentication service and the registration service for MN are performed in the same domain. It should be noted, however, that the authentication service and the registration service need not be performed in the same domain, i.e., the home agent HA may be located in an administrative domain different from the home domain. Such a situation can occur if MN is registered with an ISP located in one administrative domain, whereas a credit card company located in another domain performs authentication of MN. The server AAA_FA1 is a foreign administrative server and forms an administrative domain that encompasses the subnetworks operated by foreign agents FA1 and FA2. In other words, the foreign agents FA1 and FA2 are under a common administration. The server AAA_FA2 is also a foreign administrative server and forms an administrative domain encompassing the subnetwork operated by a foreign agent FA3.

Figure 4:
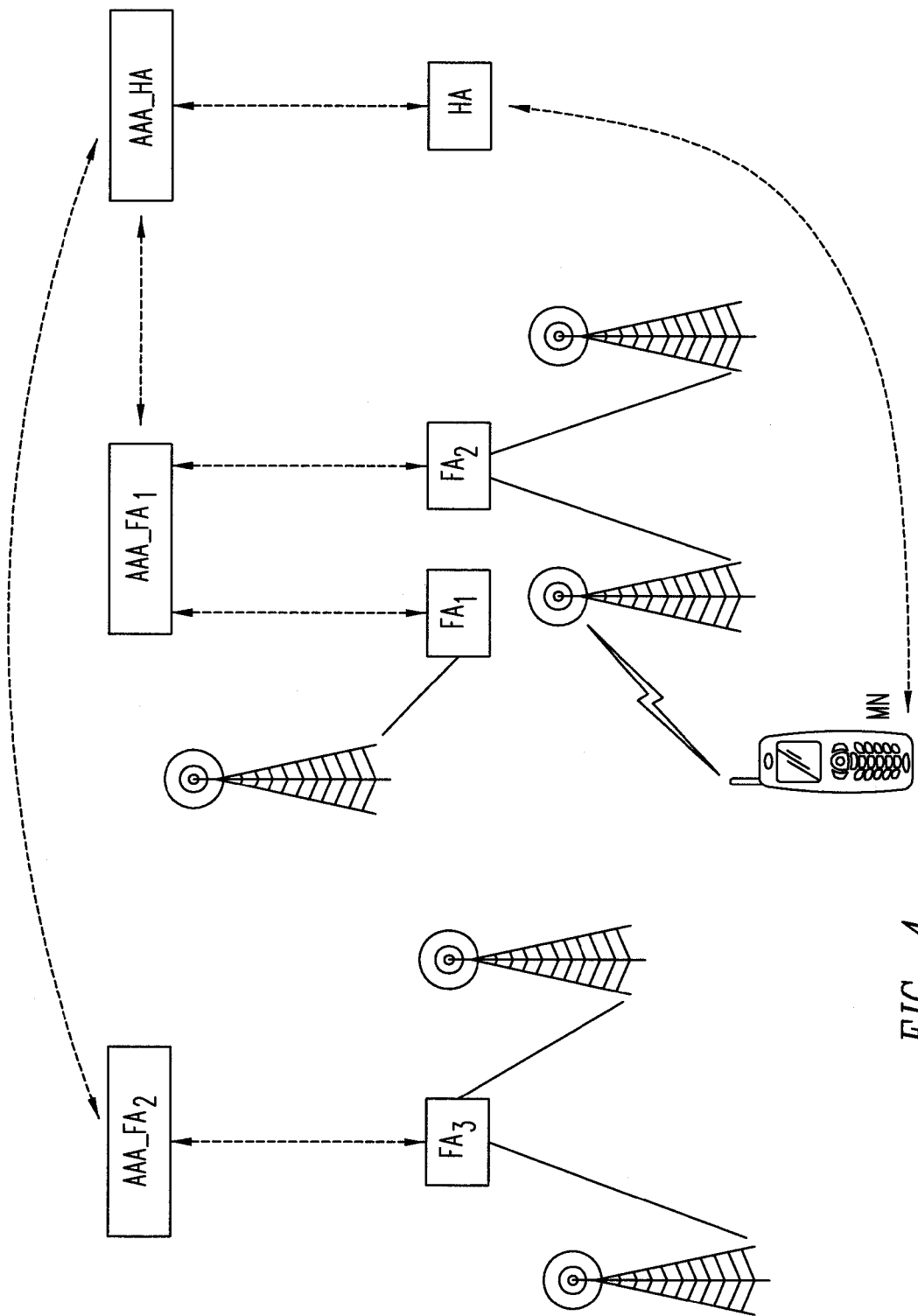
FIG. 4 is the security model implicit in the network as shown in FIG. 3 in which the broken lines indicate security associations assumed in the network.

There is a security model implicit in the network shown in FIG. 3. FIG. 4 shows such an implicit the security model in which the broken lines indicate security associations (SA) assumed among the entities. First, it is assumed that each of HA, FA1, FA2 and FA3 has a security association established with its administrative server. It is probably the case that each agent, since staying in the same administrative domain, must have communicated with its administrative server in the past. Thus, HA and AAA_HA have a pre-established security association therebetween. FA1 and FA2 each have a pre-established security association with AAA_FA1. FA3 also has a pre-established security association with AAA_FA2. Second, MN has a pre-established security association with AAA_HA because it would otherwise be impossible for AAA_HA to authenticate MN. Please note that AAA_HA is ultimately responsible for authentication of MN. Third, given the very nature of the registration process, it is unlikely that MN has a security association with a foreign agent with which it attempts to register. Lastly, the administrative servers AAA_HA, AAA_FA1 and AAA_FA2 do not need to have a pre-established security association among them but must have the ability to negotiate a security association with each other when necessary. A security association may be established between two servers by using a broker AAA server or by sharing a static pre-arranged security association.

In the present invention, Agent Advertisement messages broadcasted from the agents HA, FA1, FA2 and FA3 can be authenticated to MN. The authentication of Agent Advertisements is performed through the digital signature-digital certificate scheme, using public key cryptography. Mobile IP defines an Agent Advertisement as a modified ICMP Router Advertisement with mobility agent Extensions (see FIG. 5). The Advertisement has extensions appended thereto. In the example illustrated in FIG. 3, HA, FA1, FA2 and FA3 transmit Agent Advertisement messages in a special form verifiable by MN. More specifically, each Advertisement message is digitally signed by the transmitting agent's private key and appended with a digital certificate containing the agent's public key signed by the agent's administrative server using the server's private key. This special Agent Advertisement is called "authenticated Agent Advertisement" (ASP) and is expressed as:

$$ASP = SP \| sig_{SK_{FA}}(SP) \| cert_{AAA\_FA}(FA)$$

, where $sig_{SK_{FA}}(SP)$ denotes a raw Agent Advertisement message (SP) from a foreign agent FA which is signed by FA's private key $SK_{FA}$, and $cert_{AAA\_FA}(FA)$ denotes a certificate of FA which contains FA's public key signed by the private key of FA's administrative server AAA_FA. If MN receiving an ASP has the public key of FA's administrative server AAA_FA, it can decrypt the appended certificate and extract FA's public key from it. Using FA's public key, MN can then decrypt the Agent Advertisement message. Thus, the public key of FA's administrative server enables MN to verify the authenticity and integrity of the Agent Advertisement message and also verify the identify of the foreign agent FA that has sent the message. On the other hand, if MN does not have the public key of FA's administrative server, MN should be alerted on the authenticity and integrity of the Advertisement message and the identity of FA sending the message and should try to avoid registering with FA if other FAs around it are available for handoff that are sending verifiable Advertisement messages.

FIG. 6 is a flow chart showing the verification process according to an embodiment of the present invention.

Step 61:

In Step 61, MN hears Agent Advertisements from nearby agents. Returning to FIG. 3, MN is initially located at a starting location A and moving towards a destination C. When situated at location A, MN is registered with FA1. It is thus assumed that MN possesses the public key of AAA_FA1, which was necessary for MN to encrypt the Advertisement message from FA1 and register with it. As shown in FIG. 3, MN, starting from the location A, travels across the subnetwork operated by FA1 towards the location C. There comes a point between the location A and the location C where an L2 handoff takes place and MN loses the connection with FA1. At the location C, the two subnetworks operated by FA2 and FA3 overlap with each other. In other words, Agent Advertisements from these two agents reach the location C. It is assumed that MN in this embodiment is a multi-link-capable and that when arriving at the location C, it can hear the Agents Advertisements from FA2 and FA3. MN can be either Layer 3 single-link-capable or Layer 3 multi-link-capable. A single-link-capable MN is able to receive Agent Advertisements from agents located in one subnetwork. Even if situated in a region where a plurality of subnetworks overlap, such a MN can still receive Agent Advertisements from agents in one of the subnetworks. The choice of subnetwork takes place in MN's Layer 2. On the other hand, a multi-link-capable MN can receive Agent Advertisements from agents in all of the overlapping subnetworks. Such a MN will eventually be connected to an agent in one of the subnetworks according the choice made in its Layer 2.

Arriving at the location C, MN realizes that it has left the subnetwork operated by FA1 and entering a region where the two subnetworks operated by FA2 and FA3 are available for connection. MN has to decide which one to register with, FA2 or FA3. FA2 periodically broadcasts its authenticated Agent Advertisements ($ASP_{FA2}$) expressed as:

$$ASP_{FA2} = SP \| sig_{SK_{FA2}}(SP) \| cert_{AAA\_FA1}(FA1)$$

As discussed above, in order to decrypt $ASP_{FA2}$, MN needs the public key of AAA_FA1. Likewise, FA3 periodically broadcasts its authenticated Agent Advertisements ($ASP_{FA3}$) expressed as:

$$ASP_{FA3} = SP \| sig_{SK3}(SP) \| cert_{AAA\_FA2}(FA3)$$

In order to decrypt $ASP_{FA3}$, MN needs the public key of AAA_FA2.

Step 62:

In Step 62, MN tries to authenticate the received Agent Advertisements. When MN receives $ASP_{FA2}$ and $ASP_{FA3}$, it searches its internal cache to see if it has the public key of AAA_FA1 or AAA_FA2, or both keys. As assumed above, MN has AAA_FA1's public key because MN has once registered with FA1 located in the same administrative domain. Using AAA_FA1's public key, MN may be able to authenticate $ASP_{FA2}$. Authentication of $ASP_{FA2}$ is a two-step process. First, MN verifies the identity of FA2 sending $ASP_{FA2}$. MN extracts FA2's certificate from the certificate extension of $ASP_{FA2}$ and uses AAA_FA1's public key to validate the certificate. If MN can successfully verify the certificate, it may trust FA2 because FA2 is authenticated to MN by AAA_FA1, which MN already trusts. Second, MN verifies the authenticity and integrity of $ASP_{FA2}$. Upon verification of the certificate, MN uses FA2's public key from the certificate to verify the digital signature in the signature extension. If MN can successfully verify the digital signature, it may trust the received Advertisement $ASP_{FA2}$ because the integrity of the Advertisement is assured to MN by FA2 now authenticated.

Step 63:

In Step 63, MN selects one agent with which it is going to register. Basically, selection of an agent is a policy determination. Thus, section of an agent should be made based not on just one consideration of whether MN is successful in authenticating a particular agent, but also on other factors, such as the signal strength of an agent. Which factors should be considered and which factors are more weighted than others are ultimately a policy decision. Thus, depending on how the network is designed, it may be the case that an agent whose Advertisement is not verified is nonetheless selected over other agents whose Advertisements are successfully verified if the signal strength from the selected agent is particularly stronger than those from other agents.

Suppose that MN is successful verifying the Advertisement from FA2. If MN does not possess the public key of AAA_FA2 and cannot authenticate the Advertisement from FA3, it would probably be better off for MN to register with FA2. This is also true if MN happens to have the public key of AAA_FA2 but failed to verify the Advertisement from FA3. It should be noted, however, that as discussed above, which agent should be selected, FA2 or FA3, is ultimately a policy decision and should be determined considering other factors.

Suppose that MN is successful verifying the Advertisement from FA2. Suppose further that MN happens to have the public key of AAA_FA2 and is also successful verifying the Advertisement from FA3. FA2 and FA3 are equally available as to their authenticity. Therefore, the determination has to be made based on other factors, such as the signal strengths from the two agents.

Suppose that MN has neither the public key of AAA_FA1 nor the public key of AAA_FA2 and cannot validate the Advertisement from either FA2 or FA3. To avoid disruption of data communication currently in progress, MN has to choose one agent and try to register with it. The choice should be made based on other factors.

Figure 7:
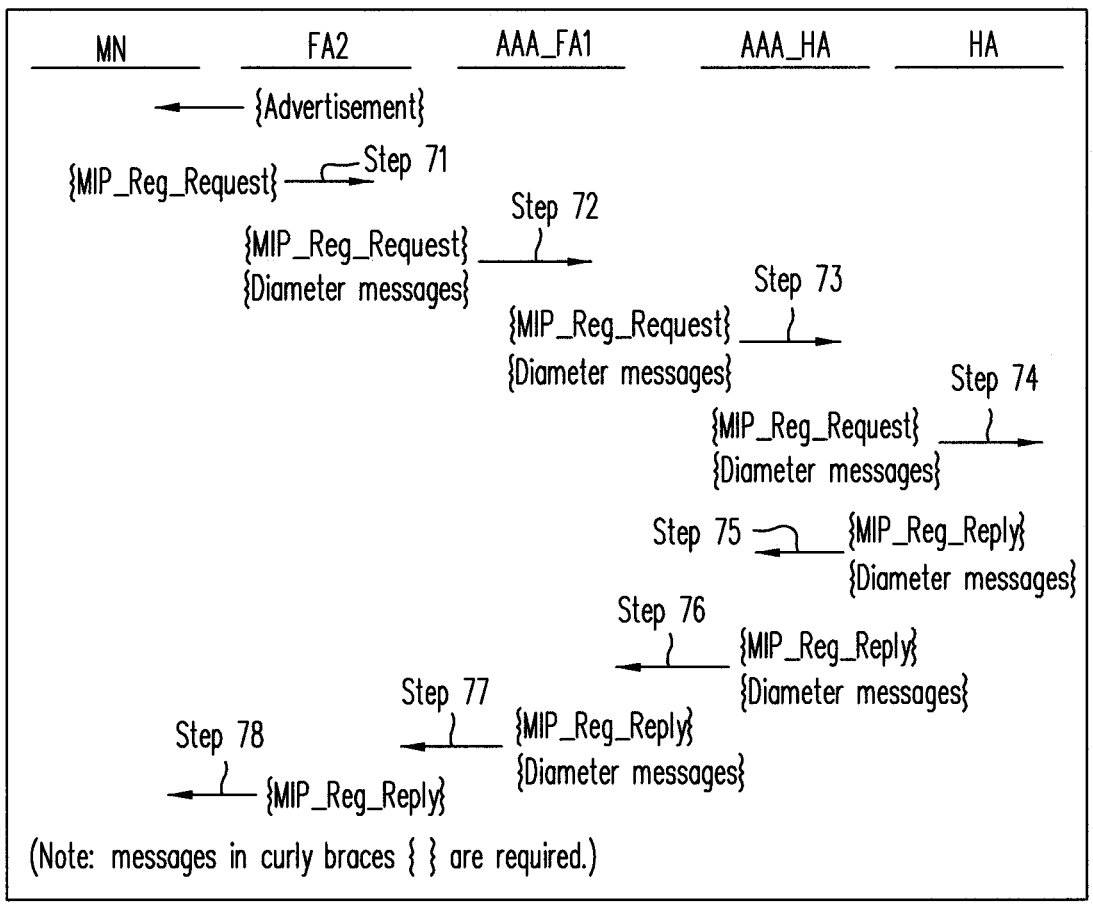
FIG. 7 is a flow chart illustrating the registration process according to the present invention in which a mobile node successfully verifies Advertisements from an agent.

Step 64:

Suppose that in STEP 63, FA2 is selected because MN was successful verifying the Advertisement $ASP_{FA2}$. MN then proceeds to register with FA2. The registration process according to an embodiment of the present invention basically follows the standards proposed by IETF RFC 2977 entitled "Mobile IP Authentication, Authorization, and Accounting Requirements", and Internet-Draft <draft-calhoun-diameter-mobileip-12.txt> entitled "Diameter Mobile IP Extensions", both of which are incorporated herein by reference. The FIG. 7 shows the registration process according to an embodiment of the present invention in which authenticity of an Advertisement is successfully verified. As shown in FIG. 7, a hierarchy path is built along which DIAMETER messages are transmitted to perform registration of MN. As assumed above, except between MN and FA2, any two neighboring entities along the path have already established, or can establish when necessary, a security association to communicate securely between them. Such a security association may be any authentication methodology, e.g., the use of manually or dynamically distributed secret keys or public-key cryptography.

As already discussed above, MN has successfully authenticated the Agent Advertisement from FA2. MN then sends a registration request (MIP_Reg_Request) to FA2 (Step 71). This request includes MN's home address, the address of MN's home agent (HA) and MN's identification, such as its Network Access Identifier (NAI). FA2 formats the request into Diameter messages and sends the formatted registration request to the local administrative server AAA_FA1 (Step 72). Upon receiving the request from FA2, AAA_FA1 determines the home administrative server of MN and forwards the request to AAA_HA (Step 73). AAA_HA performs the identity verification of MN. If AAA_HA fails to verify the identity of MN, it returns an error message to AAA_FA1. If, however, AAA_HA successfully verifies the identity of MN, AAA_HA then sends the request to HA (Step 74).

Upon receiving the registration request from AAA_HA, HA stores binding information of MN in its cache. The binding information includes MN's current point of attachment, i.e., MN's care-of address. HA then creates a registration reply and sends the reply back to AAA_HA (Step 75). AAA_HA forwards the reply to AAA_FA1 (Step 76). AAA_FA1 in turn forwards the reply to FA2 (Step 77). The reply from AAA_FA1 means to FA2 authorization of MN's network access through FA2. FA2 then forwards to MN the reply (Step 78). When MN receives the reply, the registration process ends.

Figure 8:
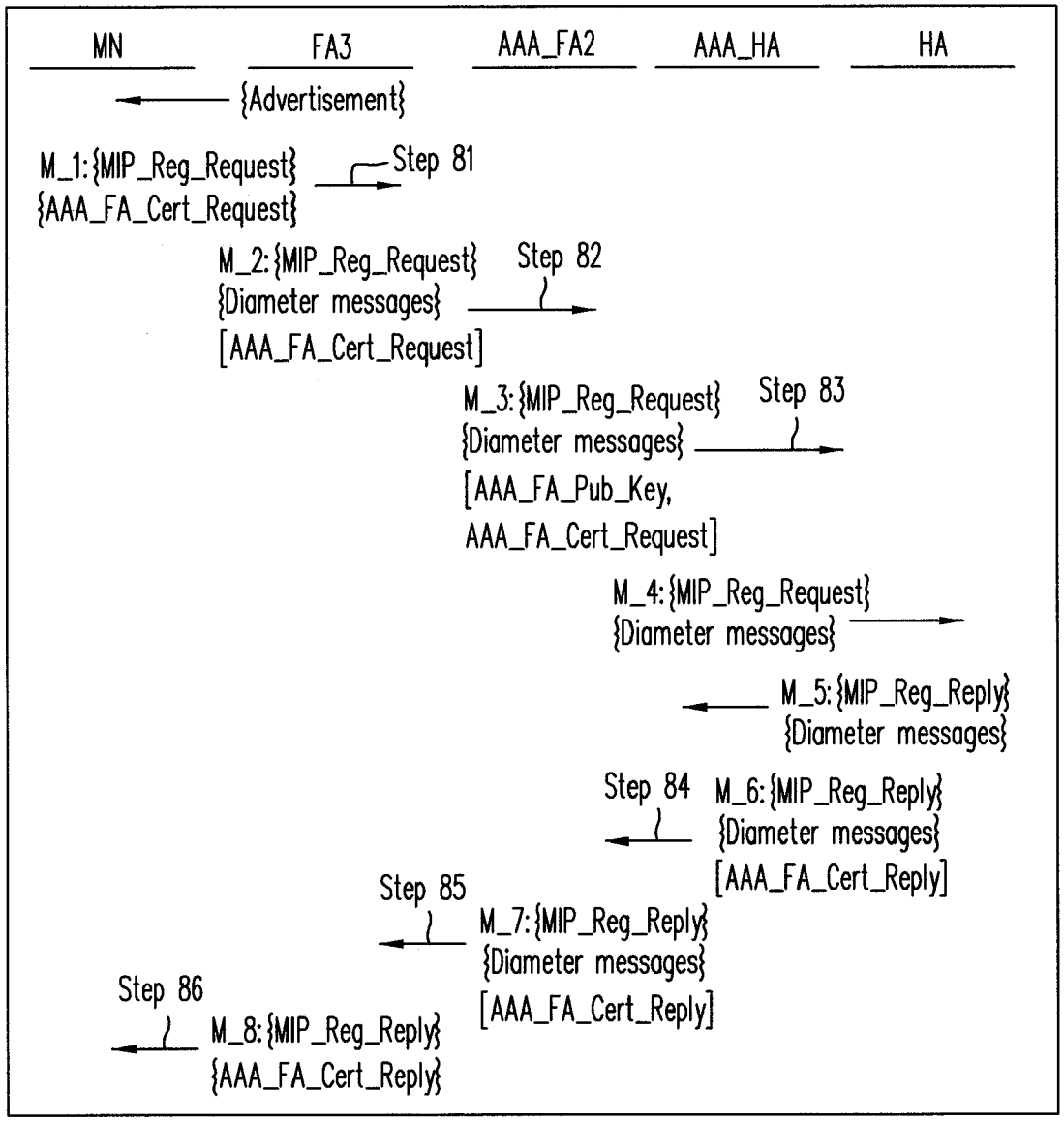
FIG. 8 is a flow chart illustrating the registration process according to the present invention in which a mobile node does not verify Advertisements from an agent.

Step 65:

Suppose that it is determined in STEP 63 that MN should register with FA3 although it does not possess the public key of AAA_FA2 and cannot authenticate the Advertisement $ASP_{FA3}$. MN will not try to authenticate the Agent Advertisements from FA3 but nonetheless proceed to register with the FA3 pursuant to the registration process illustrated in FIG. 8. The registration process shown in FIG. 8 includes the basic registration process already discussed with FIG. 7 and further includes an additional process for MN to obtain the public key of AAA_FA2. The details of the basic registration process will not be repeated. Only the additional registration process will be described with reference to FIG. 8.

MN creates a request for AAA_FA2's certificate (AAA_FA2_Cert_Request) and appends it to the registration request. MN then sends the request to FA3 (Step 81). In Step 82, FA3 forwards the AAA_FA2_Cert Request to AAA_FA2, along with the registration request. Upon receiving the AAA_FA2_Cert Request from FA3, AAA_FA2 places its public key (AAA_FA2's Pub_Key) in the AAA_FA2_Cert_Request and sends the request to AAA_HA, along with the registration request (Step 83). AAA_HA creates a certificate containing AAA_FA2's public key signed by AAA_HA's private key. AAA_HA then creates a reply (AAA_FA2_Cert_Reply) and places the certificate in the reply. AAA_HA then waits for the registration reply from HA. When AAA_HA receives the registration reply from HA, it appends the AAA_FA2_Cert_Reply to the registration reply and sends them to AAA_FA2 (Step 84). From AAA_FA2, the AAA_FA2_Cert Reply is forwarded to FA3 (Step 85) and then to MN (Step 86). Upon receiving the AAA_FA2_Cert_Reply, MN uses the public key of AAA_HA to decrypt the certificate contained therein and extracts the public key of AAA_FA2. MN originates from the domain served by AAA_HA. Therefore, MN should have the public key of AAA_HA. If MN is successful in decrypting the certificate, MN may trust AAA_FA2 and accept its public key because AAA_FA2 is authenticated to MN by the public key of AAA_HA, which MN trusts. MN stores the public key of AAA_FA2 in its cache for future use.

The public key of AAA_FA2 stored in MN's cache has a lifetime and will expire after its lifetime comes to the end. But before it expires, the public key is reusable. For instance, it may occur that after entering the domain served by AAA_FA2, MN will migrate within the domain, changing its point of attachment from one agent to another, or MN will go out of the domain but reenter the domain. If this occurs within the lifetime of AAA_FA2's public key stored in MN's cache, MN can decrypt Agent Advertisements from new agents, using the public key and proceed to register with new agents pursuant to the registration process illustrated in FIG. 7.

FIG. 9 is a flow chart showing another embodiment of the present invention. In Step 91, MN receives Agent Advertisements from a plurality of foreign agents. Suppose that MN can authenticate none of the Advertisements. In other words, the surrounding administrative domains are all new to MN, and MN does not possess any public keys of the administrative servers in the surrounding domains. To avoid disruption of data communication in progress, MN has to choose one foreign agent and proceed to register with it. The selection is made based on an assumption that reliable and trustworthy foreign agents broadcast stable Agent Advertisements over time. "Stable" means that parameters included in the Advertisements do not change over time. These parameters include the care-of address, the source address specified by RFC 2002 and other identifiers added according to the present invention, such as the certificates and keys. It is assumed that trustworthy agents broadcast the same Agent Advertisements consistently over time while malicious agents broadcast Agent Advertisements whose parameters change periodically in an attempt to lure as many mobile nodes as possible. To try to identify such malicious agents, MN listens to Agent Advertisements for a certain period of time (Step 91) and sorts the received Advertisements in groups in the order of consistency of the parameters contained therein (Step 92). In Step 93, MN picks the group of Advertisements which is ranked as being most consistent. MN then selects one Advertisement from the group which was transmitted with the highest signal strength or the shortest packet latency. In Step 94, MN attempts to register with the agent that has broadcasted the selected Agent Advertisement. If it fails to register with the agent (Step 95), it discards all the Agent Advertisements in the group and returns to Step 93. In Step 93, the MN picks the group of Advertisements which is ranked as second most consist and select one Advertisement from the group in the same was as described above. MN in Step 94 attempts to register with the agent that has the selected Advertisement. MN repeats these processes until it successfully registers with an agent. This method may not prevent MN from attempting to register with malicious agents, but it is expected to reduce the number of failed registration attempts.

What have been described are preferred embodiments of the present invention. The foregoing description is intended to be exemplary and not limiting in nature. Persons skilled in the art will appreciate that various modifications and additions may be made while retaining the novel and advantageous characteristics of the invention and without departing from its spirit. Accordingly, the scope of the invention is defined solely by the appended claims as properly interpreted.

The invention claimed is:

1. A communication network comprising a plurality of administrative domains each served by at least one administrative server and each having at least one mobility agent deployed therein, wherein each mobility agent offers connectivity to a mobile node via an advertisement message which is certified by a trusted entity for authentication by the mobile node.

2. A communication network according to claim 1, wherein the trusted entity is an administrative server serving the administrative domain to which an advertising mobility agent belongs.

3. A communication network according to claim 2, wherein the Advertisement message is signed by a private key of the advertising mobility agent and accompanied by a certificate that contains a public key of the advertising mobility agent and is signed by a private key of the trusted administrative server.

4. A communication network according to claim 3, wherein the mobile node obtains the public key of the trusted administrative server when the mobile node registers for the first time with an advertising agent belonging to the trusted administrative server.

5. A communication network according to claim 3, wherein the public key of the trusted administrative server is contained in a certificate signed by a second trusted administrative server.

6. A communication network according to claim 5, wherein the second trusted administrative server is an administrative server ultimately responsible for authentication of the mobile node.

7. A communication network according to claim 6, wherein the second trusted administrative server is an administrative server serving the administrative domain from which the mobile node originates.

8. A communication network according to claim 1, wherein the communication network builds upon AAA protocols.

9. A mobile node that receives advertisement messages from mobility agents offering connectivity to the mobile node, the mobility agents being deployed in domains each served by at least one administrative server, wherein the mobile node authenticates each advertisement message, which has been certified by a trusted entity.

10. A mobile node according to claim 9, wherein the trusted entity is an administrative server serving the domain to which an advertising mobility agent belongs.

11. A mobile node according to claim 10, wherein the Advertisement message is signed by a private key of the advertising mobility agent and accompanied by a certificate that contains a public key of the advertising mobility agent and is signed by a private key of the trusted administrative server.

12. A mobile node according to claim 9, wherein the mobile node registers with a selected one of advertising mobility agents that have been successfully authenticated.

13. A mobile node according to claim 12, wherein the selection is made based on connectivity to the advertising mobility agents that have been successfully authenticated.

14. A mobile node that receives advertisement messages from mobility agents offering connectivity to the mobile node, the mobility agents being deployed in domains each served by at least one administrative server, wherein the mobile node authenticates each advertisement message, which has been certified by a trusted entity, which is the administrative server serving the domain of an advertising mobility agent, the Advertisement message being signed by a private key of the advertising mobility agent and accompanied by a certificate that contains a public key of the advertising mobility agent and being signed by a private key of the trusted administrative server, and wherein even when the mobile node cannot authenticate any of advertising mobility agents, the mobile node nonetheless proceeds to register with a selected one of the advertising mobility agents.

15. A mobile node according to claim 14, wherein the mobile node performs the following steps: (a) sorting in groups Advertisement messages received from mobility agents over a certain period of time; (b) selecting one group of Advertisement messages; (c) selecting one Advertisement message in the selected group; (d) proceeding to register with the mobility agent that advertised the selected Advertisement message; (e) if registration is failed with the selected advertising mobility agent, discarding the selected group and returning to step (b).

16. A mobile node according to claim 15, wherein the received Advertisement messages are sorted in groups in the order of consistency of parameters contained in the messages.

17. A mobile node according to claim 16, wherein a group is selected in the step (b) which has higher consistency.

18. A mobile node according to claim 15, wherein an Advertisement message is selected in the step (c) based on connectivity of mobility agents sending the Advertisement messages.

19. A mobile node according to claim 14, wherein when registering with the selected advertising mobility agent, the mobile node requests a certificate that contains the public key of the trusted administrative server.

20. A mobile node according to claim 19, wherein the public key of the trusted administrative server is contained in a certificate signed by a second trusted administrative server.

21. A mobile node according to claim 20, wherein the second trusted administrative server is an administrative server ultimately responsible for authentication of the mobile node.

22. A mobile node according to claim 21, wherein the second trusted administrative server is an administrative server serving the administrative domain from which the mobile node originates.

23. A registration process that is implemented when a mobile node changes its point of attachment from one mobility agent to another, the process comprising the steps of: (a) deploying administrative servers each forming an administrative domain which includes at least one mobility agent therein; (b) offering by mobility agents connectivity via Advertisement messages each certified by a trusted entity; (c) receiving and authenticating Advertisement messages by the mobile node; and (d) registering by the mobile node with a selected one of the advertising mobility agents.

24. A registration process according to claim 23, wherein the trusted entity is an administrative server serving the domain to which an advertising mobility agent belongs.

25. A registration process according to claim 24, wherein the Advertisement message is signed by a private key of the advertising mobility agent and accompanied by a certificate that contains a public key of the advertising mobility agent and is signed by a private key of the trusted administrative server.

26. A registration process according to claim 23, wherein the mobile node registers with a selected one of advertising mobility agents that have been successfully authenticated.

27. A registration process according to claim 26, wherein the selection is made based on connectivity to the advertising mobility agents that have been successfully authenticated.

28. A registration process that is implemented when a mobile node changes its point of attachment from one mobility agent to another, the process comprising the steps of: (a) deploying administrative servers each forming an administrative domain which includes at least one mobility agent therein; (b) offering by mobility agents connectivity via Advertisement messages each certified by a trusted entity; (c) receiving and authenticating Advertisement messages by the mobile node; and (d) registering by the mobile node with a selected one of the advertising mobility agents, wherein the trusted entity is an administrative server serving the domain to which an advertising mobility agent belongs, wherein the Advertisement message is signed by a private key of the advertising mobility agent and accompanied by a certificate that contains a public key of the advertising mobility agent and is signed by a private key of the trusted administrative server, and wherein even when the mobile node cannot authenticate any of advertising mobility agents, the mobile node nonetheless proceeds to register with a selected one of the advertising mobility agents.

29. A registration process according to claim 28, further including the following steps: (a) sorting in groups Advertisement messages received from mobility agents over a certain period of time; (b) selecting one group of Advertisement messages; (c) selecting one Advertisement message in the selected group; (d) proceeding to register with the mobility agent that advertised the selected Advertisement message; (e) if registration is failed with the selected advertising mobility agent, discarding the selected group and returning to step (b).

30. A registration process according to claim 29, wherein the received Advertisement messages are sorted in groups in the order of consistency of parameters contained therein.

31. A registration process according to claim 29, wherein a group is selected in the step (b) which has higher consistency.

32. A registration process according to claim 29, wherein an Advertisement message is selected in the step (c) based on connectivity of mobility agents sending the Advertisement messages.

33. A registration process according to claim 28, wherein when registering with the selected advertising mobility agent, the mobile node requests a certificate that contains the public key of the trusted administrative server.

34. A registration process according to claim 33, wherein the public key of the trusted administrative server is contained in a certificate signed by a second trusted administrative server.

35. A registration process according to claim 34, wherein the second trusted administrative server is an administrative server ultimately responsible for authentication of the mobile node.

36. A registration process according to claim 35, wherein the second trusted administrative server is an administrative server serving the administrative domain from which the mobile node originates.

37. A registration process according to claim 23, wherein the network builds on AAA protocols.

* * * * *